United States Patent [19]

Rocchitelli

[11] 4,131,398

[45] Dec. 26, 1978

[54] GLASS WASHING ELECTROMAGNETIC PUMP, MORE PARTICULARLY FOR WINDSCREENS OF MOTOR VEHICLES

[76] Inventor: Onofrio Rocchitelli, 20, Via Stoppani, Rho, Milan, Italy, 20017

[21] Appl. No.: 742,701

[22] Filed: Nov. 17, 1976

[30] Foreign Application Priority Data

Nov. 24, 1975 [IT] Italy .............................. 29561 A/75

[51] Int. Cl.² .......................................... F04B 17/04
[52] U.S. Cl. .................................. 417/418; 92/85 R; 318/122; 361/210
[58] Field of Search ............... 417/416, 417, 418, 419; 361/210, 167; 92/85; 318/122

[56] References Cited

U.S. PATENT DOCUMENTS

| | | | |
|---|---|---|---|
| 461,295 | 10/1891 | Van Depoele | 417/418 |
| 494,053 | 3/1896 | Birkin | 318/122 |
| 720,596 | 2/1903 | Marshall | 318/122 |
| 766,810 | 8/1904 | Chambers et al. | 310/35 |
| 1,783,611 | 12/1930 | Gohring | 417/418 |
| 1,954,575 | 4/1934 | Pearson | 318/122 |
| 2,443,344 | 6/1948 | Ekleberry | 417/418 |
| 2,465,688 | 3/1949 | Jenkins | 318/122 |
| 2,515,110 | 7/1950 | Bornstein | 417/418 |
| 2,578,902 | 12/1951 | Smith | 417/418 |
| 2,833,220 | 5/1958 | Robinson et al. | 417/418 |
| 3,134,938 | 5/1964 | Morgan | 417/418 |
| 3,327,633 | 6/1967 | Duinker et al. | 417/418 |

Primary Examiner—C. J. Husar
Attorney, Agent, or Firm—Bryan & Bollo

[57] ABSTRACT

A glass washing electromagnetic pump comprising a cylinder in communication at both ends with two ducts, said ducts being a suction duct and a delivery duct, said cylinder containing a piston which is alternately moved toward the one or the other side of the cylinder by means of the alternate energization of two electromagnets enclosing said cylinder, so that at each movement or stroke of the piston there is at the same time a delivery action from one chamber defined by said piston inside said cylinder and a suction action in the other chamber.

7 Claims, 4 Drawing Figures

GLASS WASHING ELECTROMAGNETIC PUMP, MORE PARTICULARLY FOR WINDSCREENS OF MOTOR VEHICLES

BACKGROUND OF THE INVENTION

Pumps adapted to spray liquid for cleaning windscreens of motor vehicles are already known. These pumps are sucking water or water added with detergent substances from a reservoir and are delivering it under pressure to one or more nozzles spraying it on the windscreen of said motor vehicle.

These pumps may be either hand operated, i.e. actuated directly by the driver and nowadays almost obsolete, or electrically controlled by a switch and operated by the electric current supplied by the battery of the motor vehicle and consisting of a centrifugal miniaturized pump actuated by a motor causing the pump impeller to rotate and sucking the liquid from the reservoir delivering it under pressure, generated by centrifugal force, to the conduit leading to the spraying nozzles.

This kind of pump has the drawback, in addition to a high manufacturing cost, of having a low pressure head because of the reduced dimensions of the impeller, so that eventual impurities which should be formed in the spraying nozzles, are not expelled and therefore it is easy that said nozzles become clogged, even during use and then they must be cleaned by hand.

Furthermore, because of the loss of a sealing ring which is necessarily of little size on shafts rotating at speeds near 10,000 rpm, these pumps often undergo irremediable failure, in view of the chemical composition of the cleaning additives mixed with water.

Electromagnetic pumps are also known in the art, wherein a piston is electromagnetically moved in the compression stroke and is returned to the starting position either by gravity, but this involves a particular position of the pump, or by use of a biassing spring. These types have the drawback that a position of the electromagnetic force is used either for spring compression or for lifting the piston weight which must be proportionally high in order to allow the return stroke by gravity.

SUMMARY OF THE INVENTION

The present invention relates to an electromagnetically operated pump combining the following advantages: economic and easy manufacture and removal of the above mentioned drawbacks; particularly high pressure head; no idle piston strokes, no energy waste to compress springs or lift heavy moving parts; and possibility of being mounted in any desired position.

The invention provides an electromagnetic double acting pump, so that at each movement of the piston (actuated by two coils arranged in parallel and alternately energized or disenergized according to the piston position) in either direction, there is at the same time suction in one cylinder and delivery in the other (so as to require only half the previously required cylinder volume to provide the same output, reducing piston weight and avoiding return springs), the sequence of energization of the coils being controlled by a novel device actuated by the residual magnetization of the piston.

BRIEF DESCRIPTION OF THE DRAWING

The present invention will be better understood by making reference to the following detailed description of a preferred embodiment, which is to be construed as a non limiting example only to be read in conjunction with the accompanying drawing, in which.

DETAILED DESCRIPTION OF THE PREFERRED EMBODIMENT

Figure 3:
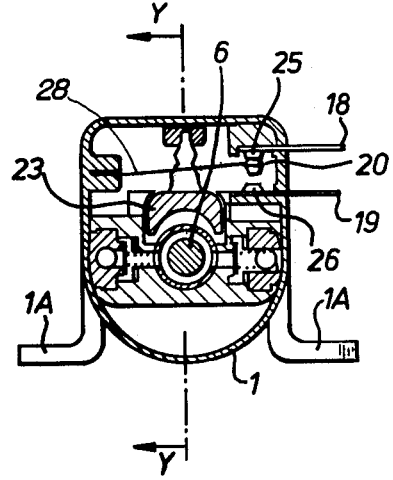
FIG. 3 is a cross-sectional view taken along line X—X of FIG. 2.

With reference now to the figures of the accompanying drawing, the pump according to the present invention consists of an envelope or case 1 constituting the housing of the pump elements. The case 1 may be of any suitable material and therefore preferably also of plastics, and is provided with supporting and clamping feet 1A as shown in FIG. 3 or with other suitable members.

From this case 1 two pipe pieces 2 and 3 are coming out, which are the external extension of two internal ducts 4 and 5. The pipe 2 is the suction inlet from a reservoir while the pipe 3 is the delivery outlet to the washing nozzles.

At the middle of said case 1 there is a cylinder 6 in which a double acting piston 7 of magnetic material is so arranged as to be attracted by electromagnets B1 and B2. Said cylinder 6 is closed at both ends by two tapered plugs 8 and 9 of elastic material having the function of dampening the impact of piston 7 caused by its abrupt attraction by the electromagnet.

The cylinder 6 has also two openings at each end. The openings 10-11 are connecting it with the suction duct 4 while the openings 12-13 are connecting it with the delivery duct 5, through suitable passages.

The connection at one end of the cylinder of opening 10 with the suction duct 4 may be shut off by means of the valve 14 while the connection of opening 12 with the delivery duct 5 may be shut off by means of the valve 15. Also at the other end of the cylinder, the connection of opening 11 with suction duct 4 may be shut off by means of the valve 16 while the connection of opening 13 with the delivery duct 5 may be shut off by means of the valve 17. The reference numerals 14, 15, 16 and 17 are indicating the whole valve assembly with its additional members such as springs and the like.

These valves are automatically controlled by the movements of piston 7 so that the valves 14 and 16 are opened when piston 7 is carrying out suction in that part of the cylinder, the same suction providing to close valves 15 and 17. On the contrary, valves 14 and 16 are closed when the piston 7 is carrying out compression in the same part, said compression providing to open valves 15 and 17.

Figure 1:
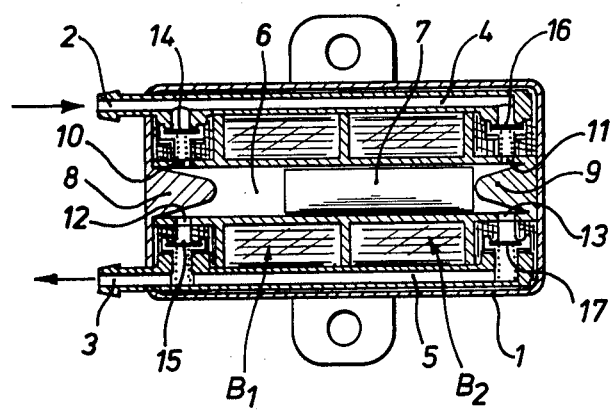
FIG. 1 is a longitudinal section of the pump taken along line Z—Z of FIG. 2 that is along the suction and delivery pipes.
Figure 2:
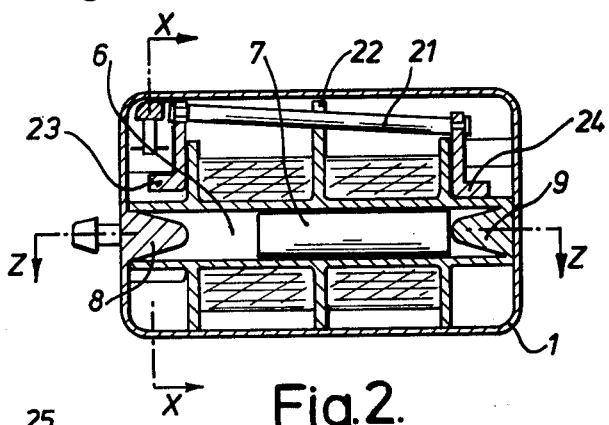
FIG. 2 is a longitudinal section of said pump, taken along line Y—Y of FIG. 3, that is at the device controlling current reversal to the coils.

For example in the stage of movement of the piston 7 from left to right (see FIG. 1) valves 14 and 17 are opened and valves 15 and 16 are closed, so that the liquid entering from valve 14 fills up the left side of cylinder 6 while liquid contained in the right side of the cylinder 6 goes out from valve 17; conversely when the piston 7 moves from right to left valves 16 and 15 are opened and the liquid which was previously sucked in the left-hand chamber of cylinder 6 through valve 15 goes into duct 5 and pipe 3 and to the nozzles, while at the same time through pipe 2 and duct 4 as well as valve 16 fresh liquid is sucked from reservoir into the right-hand chamber of cylinder 6. The movement of piston 7 from one side to the other of cylinder 6 is obtained by alternately energizing the coils of two electromagnets B1 and B2, so that the piston is abruptly attracted either to the right side or to the left side of the cylinder 6.

Figure 4:
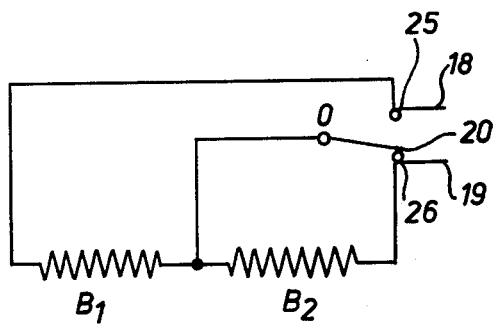
FIG. 4 is the diagram of the electric circuitry by which sparking of the contacts is substantially avoided (so as to avoid use of capacitors and the like).

The current feed of the coils of both electromagnets B1 and B2 is supplied to terminals 18 and 19 (see FIGS. 3 and 4). Reversal of feed from one coil to the other is obtained through contact 20 of a microswitch controlled by the rocker arm 21 which is fulcrumed at point 22 in the middle of the pump.

The rocker arm 21 bears at both ends two weights 23 and 24 of magnetically sensitive material and with one of said ends (as shown in FIG. 3) also drives contact 20 of microswitch by the use of a deflection piece 28 shown in FIG. 3 so as to bring it alternately into contact with contacts 25 and 26 connected to terminals 18 and 19 from which the current feed is incoming.

Therefore, when piston 6 reaches one end of cylinder 7 being attracted there by the electromagnet arranged on that side, whose coil was put under voltage, this electromagnet being under the influence of a magnetic force, and thus magnetized, attracts the corresponding weight placed on the rocker arm so as to move or deviate the movable contact 20 of microswitch toward the other terminal contact, so as to energize the other coil, so that piston 7 is attracted to the opposite side of cylinder 6 attracting the other weight of the rocker arm and reversing again the electrical connection and so forth.

The operation of the device of the invention is as follows: first of all it must be pointed out that the movable contact 20 of microswitch when in the inoperative position, may be in contact either with terminal 18–25 or with contact 19–26, whatever may be the position of the pump when started.

By feeding the terminals 18 and 19 with direct current, one of the two coils is magnetized so as to attract the piston toward the magnetized end and to discharge a water jet while an amount of water equal to the discharged one is sucked at the same time at the opposite end.

At the same time the piston, which is also made of magnetically sensitive material such as mild steel, being under the influence of a magnetic force, directly attracts the rocker arm, so as to cause movement or deviation of contact 20 of microswitch, releasing the short-circuited coil and locking the other coil and so forth repeating the operative cycle of the pump. It is clear that a continuous and particularly abrupt and strong jet of liquid is obtained with this arrangement.

Referring now to FIG. 4 it is to be understood that the circuitry of electric control of electromagnets B1 and B2 has some novel features of great importance. This particular arrangement of the circuitry allows to reduce the connection and disconnection current between the moving contact and the fixed contacts at fully negligible levels (connections and disconnections are taking place at a frequency of 100 operations per minute) and therefore to avoid sparking and the consequent wear of contacts.

As a matter of fact, instead of feeding in parallel the two coils of the electromagnets B1 and B2, shunting one of their poles with one current pole and feeding alternately the other pole with the current supplied by the moving contact, as one can see from the diagram, the two coils of the electromagnets B1 and B2 are connected in series and also fed in series by the direct current supply source arriving at the terminals 18 and 19.

With the wire connecting in series two poles of the coils, another wire going to the moving contact 20 is joined, so that if neither contact 25 and 26 is connected with the moving contact 20, when the switch arranged on the feed line is actuated, the two coils receiving current would generate equal magnetic fields in the two electromagnets B1 and B2. However, if the moving contact 20 is in contact with terminal 19, the coil of electromagnet B2 is short-circuited and all the current feeds electro-magnet B1, so that piston 7 is attracted to the left and the opposite happens when the moving contact 20 is in contact with terminal 19.

This arrangement has the consequence that the coils of electromagnets B1 and B2, being alternately short-circuited, remain under voltage also in this stage. It has been found that by means of this arrangement, the phenomenon of sparking between contacts at the connection and disconnection of contact 20 with terminals 18 and 19 is almost completely avoided, while this phenomenon of sparking would occur when the contact 20 itself is one of the current leading poles.

It has to be understood that many variations, modifications, substitutions and alterations of elements may readily occur to one skilled in the art without departing however from spirit and scope of the invention as defined in the appended claims.

I claim:

1. An electromagnetic glass washing pump comprising:
   a cylinder;
   a magnetically sensitive reciprocating piston housed in said cylinder;
   two electromagnets positioned around said cylinder so that said electromagnets are at opposing ends of said cylinder;
   said electromagnets electrically connected in series;
   a switch having two fixed contacts and a central movable contact;
   said central movable contact of said switch electrically connected to said electromagnets at said electromagnets' series connection;
   said fixed contacts of said switch electrically connected to said electromagnets at the ends remote from said series connection so that one of said fixed contacts is electrically connected to one electromagnet and the other said fixed contact is electrically connected to the other said electromagnet;
   said fixed contacts of said switch connected to a D.C. power supply so that one of said fixed contacts is maintained at a higher voltage than the other said fixed contact;
   said central movable contact alternately contacting said fixed contacts and electrically shorting the electromagnet connected between said fixed contact and said series connection;
   said central movable contact moving between said fixed contacts so that during switching said central movable contact is not contacting either of said fixed contacts allowing current to pass through both electromagnets;
   a casing having a fluid inlet and a fluid outlet surrounding said cylinder;
   means to selectively introduce fluid from said fluid inlet into said cylinder alternately at either end of said cylinder;

means to selectively discharge fluid from said cylinder to said fluid outlet alternately at either end of said cylinder;

said reciprocating piston alternately forcing fluid from the cylinder at one end while drawing fluid into the cylinder at the other end;

a fulcrummed rod having magnetically sensitive ends;

said magnetically sensitive ends of said rod in magnetic communication with an electromagnetic field induced alternately at each end of said cylinder by said electromagnets so that said rod rocks toward the end of said cylinder which is electromagnetically energized;

said movable contact attached to one end of said fulcrummed rod so that the rocking motion of said fulcrummed rod causes the movable contact to complete a circuit alternately with said fixed contacts to induce the electromagnetic field at the opposite end of said cylinder.

2. The electromagnetic glass washing pump claimed in claim 1 comprising:

elastic bumpers at each end of said cylinder to cushion the impact of said piston;

said elastic bumpers tapered to allow the introduction and discharge of fluid from said cylinder.

3. The electromagnetic glass washing pump claimed in claim 1 further comprising in the means to introduce fluid:

inlet check valves permitting fluid to flow into said cylinder when a pressure differential exists to draw fluid into said cylinder and preventing fluid from returning when the pressure differential is reversed;

tubing connecting said fluid inlet means and said inlet check valves to provide a substantially rigid flow path for fluid introduced through said fluid inlet means.

4. The electromagnetic glass washing pump claimed in claim 3 wherein the means to discharge fluid comprises:

outlet check valves permitting fluid to flow into said fluid outlet means when a pressure differential exists to force fluid into said fluid outlet means and preventing fluid from returning when the pressure differential is reversed;

tubing connecting said outlet check valves and said fluid outlet means to provide a substantially rigid flow path for fluid discharged through said outlet check valves.

5. The electromagnetic glass washing pump claimed in claim 1 wherein said fluid inlet and fluid outlet comprise:

substantially rigid tubing positioned within said casing and protruding from one end of said casing;

said tubing connected to the respective means to selectively introduce and discharge fluid into and from said cylinder.

6. The electromagnetic glass washing pump claimed in claim 1 wherein the magnetically sensitive ends of said fulcrummed rod comprise:

weights of magnetically sensitive material secured to said fulcrummed rod;

said weights positioned so that said electromagnets provide sufficient attraction of said weights to cause said fulcrummed rod to rock towards said electromagnets when energized.

7. An electromagnetic glass washing pump comprising:

a cylinder;

a magnetically sensitive reciprocating piston housed in said cylinder;

two electromagnets positioned around said cylinder so that said electromagnets are at opposing ends of said cylinder;

said electromagnets electrically connected in series;

a casing having a fluid inlet and a fluid outlet surrounding said cylinder;

said fluid inlet and fluid outlet comprising substantially rigid tubing positioned within said casing and protruding from one end of said casing;

inlet check valves positioned near both ends of said cylinder permitting fluid to flow into said cylinder when a pressure differential exists and preventing fluid from returning when the pressure differential is reversed;

tubing connecting said fluid inlet and said inlet check valves to provide a substantially rigid flow path for fluid introduced through said fluid inlet means;

outlet check valves positioned near both ends of said cylinder permitting fluid to flow from said cylinder when a pressure differential exists and preventing fluid from returning when the pressure differential is reversed;

tubing connecting said fluid outlet and said outlet check valves to provide a substantially rigid flow path for fluid discharged through said outlet check valves;

a fulcrummed rod bearing weights of magnetically sensitive material at the ends of said fulcrummed rod;

said weights positioned so that said electromagnets provide sufficient attraction of said weights to cause said fulcrummed rod to rock towards said electromagnets when energized;

a switch having two fixed contacts and a central movable contact;

said central movable contact capable of contacting each of said fixed contacts so that said movable contact can be switched from one fixed contact to the other fixed contact;

said central movable contact electrically connected to said electromagnets series connection;

said fixed contacts electrically connected to said electromagnets at the ends remote from said series connection so that one of said fixed contacts is electrically connected to one electromagnet and the other said fixed contact is electrically connected to the other electromagnet;

said fixed contacts electrically connected to a D.C. power supply so that one of said fixed contacts is maintained at a higher voltage than the other said fixed contact;

said central movable contact attached to one end of said fulcrummed rod so that the rocking motion of said fulcrummed rod causes said central movable contact to be switched from one fixed contact to the other fixed contact;

said central movable contact alternately contacting said fixed contacts and alternately shorting the electromagnets connected to said fixed contacts;

said central movable contact moving between said fixed contacts so that during switching said central movable contact is not contacting either of said fixed contacts and current passes through both electromagnets at once;

elastic bumpers at each end of said cylinder to cushion the impact of said piston;

said elastic bumpers tapered to allow introduction and discharge of fluid to and from said cylinder.

* * * * *